United States Patent
Ramesh et al.

(10) Patent No.: US 12,339,846 B2
(45) Date of Patent: Jun. 24, 2025

(54) ESTIMATOR OF RESOURCE CONSUMPTION BY QUERY EXECUTION PLAN STEPS

(71) Applicant: Teradata US, Inc., San Diego, CA (US)

(72) Inventors: Bhashyam Ramesh, Secunderabad (IN); Douglas P. Brown, Rancho Santa Fe, CA (US); Vijayasaradhi Indurthi, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 216 days.

(21) Appl. No.: 17/974,861

(22) Filed: Oct. 27, 2022

(65) Prior Publication Data
US 2024/0143589 A1    May 2, 2024

(51) Int. Cl.
*G06F 16/2453*    (2019.01)
*G06N 20/20*    (2019.01)

(52) U.S. Cl.
CPC ....... *G06F 16/24545* (2019.01); *G06N 20/20* (2019.01)

(58) Field of Classification Search
CPC ........ G06F 16/24545; G06F 16/24547; G06N 20/20; G06N 20/00
See application file for complete search history.

(56) References Cited

U.S. PATENT DOCUMENTS

| | | | |
|---|---|---|---|
| 8,516,488 B1* | 8/2013 | Brown | G06F 9/5038 707/718 |
| 2010/0145929 A1* | 6/2010 | Burger | G06F 16/24542 707/E17.017 |
| 2020/0285642 A1* | 9/2020 | Bei | G06N 5/01 |

OTHER PUBLICATIONS

Patel, Fundamental concepts for Model Selection and Model Evaluation Part 1, pp. 1-16, May 3 (Year: 2020).*
Nagarajah, A Review on Automated Machine Learning (AutoML) Systems, pp. 1-6 (Year: 2019).*

* cited by examiner

*Primary Examiner* — Albert M Phillips, III
(74) *Attorney, Agent, or Firm* — Gates & Cooper LLP (57) ABSTRACT

A method, apparatus and computer program product for estimating resource consumption for steps in a query execution plan for a query performed by a relational database management system (RDBMS) in a computer system. Past execution data for the steps are used to train a machine learning (ML) model and its model parameters to predict execution times for the steps. A prediction module comprised of the ML model configured by the model parameters predicts an execution time for a current step of the query execution plan for the query, based on current step information and current system load. A boosting module boosts the current step either up or down for processing by the RDBMS to meet a service level goal (SLG) for the query, based on the predicted execution time for the current step, as well as an elapsed query time, a query SLG time, and/or a query CPU time.

18 Claims, 6 Drawing Sheets

ESTIMATOR OF RESOURCE CONSUMPTION BY QUERY EXECUTION PLAN STEPS

BACKGROUND OF THE INVENTION

1. Field of the Invention

This invention relates to methods and systems for estimating resource consumption by query execution plan steps.

2. Description of Related Art

The time taken for a relational database management system (RDBMS) to execute a query depends on many factors, including, but not limited to, the complexity of the query, the number of tables referenced by the query, the number of steps in the query, the type of join operators planned by the optimizer, the selectivity of the rows from left and right sides of the join operators, the aggregations used, the indexes available on the tables, etc.

In addition, the current load conditions of the system on which the query is executed also impacts the execution time. There may be other factors, including the unavailability of resources due to locks and other processes getting spawned, finishing of other queries etc.

Due to these factors, it is difficult to estimate the execution time of a query. Estimating the execution time of a query is an important factor in meeting a service level goal (SLG) for the query.

Thus, there is a need in the art for improved methods and systems for predicting that a specific query may take a longer execution time than the SLG, and for boosting the resources necessary to ensure that the query can run faster, thereby minimizing any SLG failures. The present invention satisfies this need.

SUMMARY OF THE INVENTION

To overcome the limitations in the prior art described above, and to overcome other limitations that will become apparent upon reading and understanding this specification, the present invention discloses a method, apparatus and computer program product for estimating resource consumption of steps in a query execution plan for a query performed by an RDBMS in a computer system.

Past execution data for the steps are used to train a machine learning (ML) model and its model parameters to predict execution times for the steps.

A prediction module comprised of the ML model configured by the model parameters predicts an execution time for a current step of the query execution plan for the query, based on current step information and current system load. The prediction module may select the ML model configured by the model parameters based on the current step information; the prediction module may select the ML model configured by the model parameters based on the current system load; and/or the prediction module may select the ML model configured by the model parameters based on different workloads for a time of day, week, month or year.

A boosting module boosts the current step either up or down for processing by the RDBMS to meet a SLG for the query, based on the predicted execution time for the current step, as well as an elapsed query time, a query SLG time, and/or a query CPU time. The elapsed query time is an amount of time spent in processing the query execution plan. The query SLG time is an amount of time allocated for processing the query execution plan to meet the SLG for the query, wherein the query SLG time is apportioned for each step of the query execution plan. The query CPU time is an amount of CPU time allocated for processing the query execution plan to meet the SLG for the query, wherein the query CPU time is apportioned for each step of the query execution plan.

The boosting module compares the predicted execution time for the current step to the elapsed query time, the query SLG time, and/or the query CPU time, to determine a direction and an extent of the boost for the current step. The boosting module may instruct the RDBMS to boost a priority used in executing the current step; and/or the boosting module also may instruct the RDBMS to boost an allocation of resources used in executing the current step, wherein the allocation of resources used in executing the current step comprises CPU or I/O shares.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

OVERVIEW

In this invention, an ML model can predict that a query may take longer to execute than specified in the query's SLG. In response, resources of the RDBMS can be boosted to ensure that the query can run faster, thereby minimizing any SLG failures.

Specifically, this invention uses past execution data for one or more steps of a query execution plan for a query to create and train the ML model in order to predict the execution time, also referred to as the elapsed time, of a current step. This prediction can be used to boost the current step of the query execution plan either up or down in priority or the allocation of resources, such as CPU and/or I/O shares.

Using the ML model, this invention provides an improvement in meeting the query's SLG. Moreover, the present invention has the ability to use the predictions to minimize SLG failures.

Hardware and Software Environment

Figure 1:
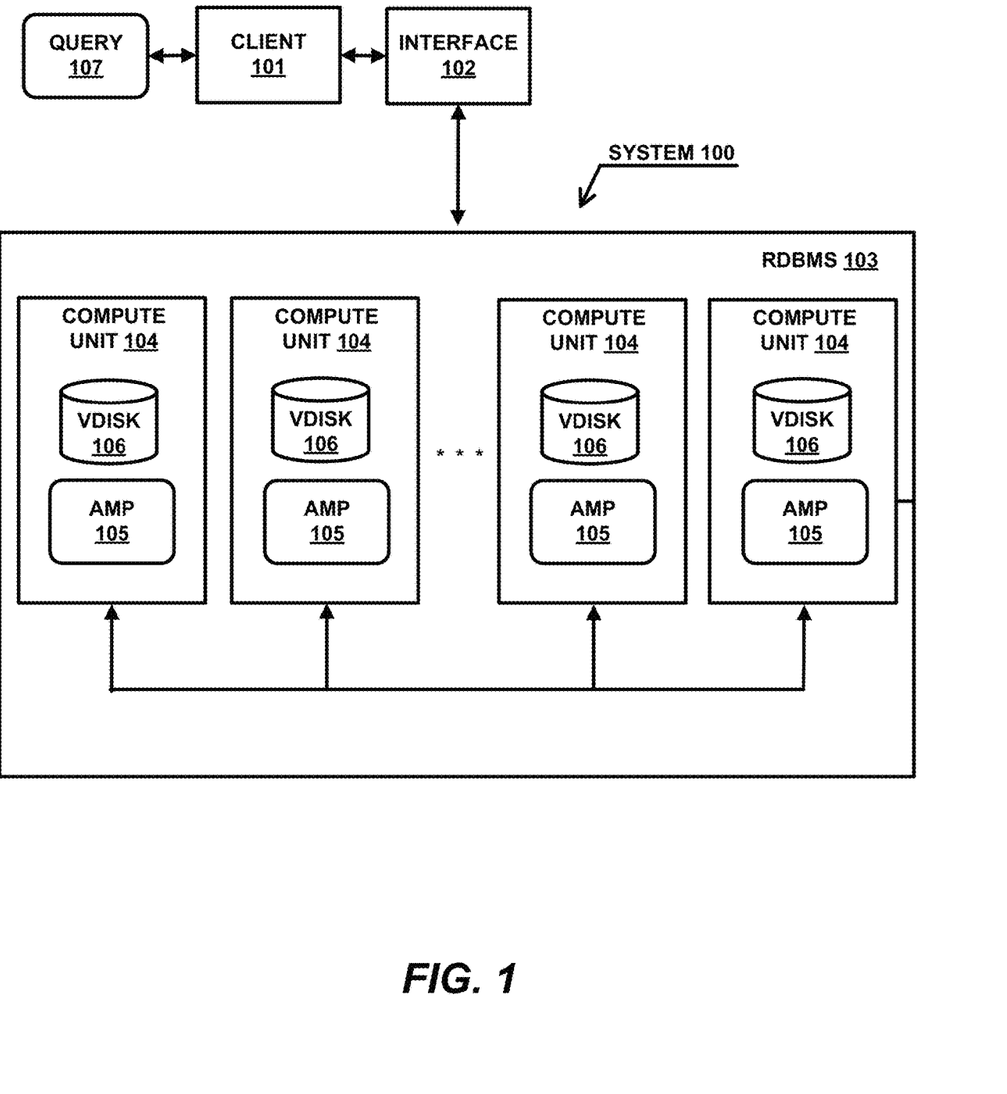
FIG. 1 illustrates an exemplary hardware and software environment, according to an embodiment of the present invention.

FIG. 1 illustrates an exemplary hardware and software environment according to one embodiment of the present invention. In the exemplary environment, a computer system 100 implements a data warehouse in a three-tier client-server architecture, wherein the first or client tier provides clients 101 that may include, inter alia, a graphical user interface (GUI), the second or middle tier provides an interface 102 for interfacing with the data warehouse, and the third or server tier comprises the data warehouse, which is an RDBMS 103 that stores data and metadata in a relational database. The first, second, and third tiers may be implemented in separate computers, or may be implemented as separate or related processes in a single computer.

In the preferred embodiment, the RDBMS 103 is executed by one or more compute units 104, e.g., processors, in the computer system 100, wherein the RDBMS 103 manages a relational database comprised of one or more tables stored on one or more data storage devices connected to the computer system 100. In one embodiment, the computer system 100 is comprised of one or more access module processors (AMPS) 105 performing the functions of the RDBMS 103 and one or more virtual disks (VDISKs) 106 storing the relational database of the RDBMS 103. The AMPS 105 and VDISKs 106 may be implemented in separate processors, or may be implemented as separate or related processes in a single processor.

The RDBMS 103 used in the preferred embodiment comprises the Teradata® RDBMS sold by Teradata US, Inc., the assignee of the present invention, although other DBMS's could be used. In this regard, the Teradata® RDBMS is a hardware and software based data warehousing and analytic application/database system.

Generally, operators or users of the computer system 100 interact with the clients 101 to formulate a workload comprised of one or more queries 107 for the RDBMS 103, wherein the requests are transmitted via the interface 102 to the RDBMS 103, and responses are received therefrom. The RDBMS 103 performs a workload comprised of one or more queries 107 against a relational database comprised of one or more tables storing data. Specifically, the RDBMS 103 performs the functions described below, including accepting the workload comprised of the queries 107, then performing the queries 107 to process data retrieved from the tables. Moreover, the results from these functions may be provided directly to clients 101, or may be provided to other systems (not shown) by the interface 102, or may be stored by the RDBMS 103 in the relational database.

Note that, in one or more embodiments, the computer system 100 may use any number of different parallelism mechanisms to take advantage of the parallelism offered by the multiple tier architecture, the client-server structure of the client 101, interface 102, and RDBMS 103, as well as the multiple compute nodes 104, AMPs 105 and VDISKs 106. Further, data within the relational database may be partitioned across the compute units 104, AMPS 105 and VDISKs 106 to provide additional parallelism.

In one embodiment, each of the compute units 104 manages a portion of the database that is stored in a corresponding one of the VDISKs 106. For example, the rows and/or columns of tables stored in the VDISKs 106 may be partitioned across the compute units 104 to ensure that workloads are distributed evenly across the compute nodes 104. The RDBMS 103 organizes the storage of data and the distribution of rows and/or columns of tables among the compute nodes 104. The RDBMS 103 also coordinates the execution of the queries 107 by the AMPs 105, and the retrieval of data from the VDISKs 106, in response to the queries 107.

Generally, the system 100, clients 101, interface 102, RDBMS 103, compute units 104, AMPs 105, VDISKs 106, and queries 107, comprise hardware and/or software and/or data, including logic and/or data tangibly embodied in and/or accessible from a device, media, carrier, or signal, such as RAM, ROM, one or more of the data storage devices, and/or a remote system or device communicating with the computer system 100 via one or more data communications devices. Elements of 101-107 may also be tangibly embodied in memory and/or data communications devices, thereby making a computer program product or article of manufacture according to the invention. As such, the terms "article of manufacture," "program storage device" and "computer program product" as used herein are intended to encompass a computer program accessible from any computer readable device or media. Accordingly, such articles of manufacture are readable by a computer and embody at least one program of instructions executable by a computer to perform various method steps of the invention.

However, those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Query Processing

Figure 2:
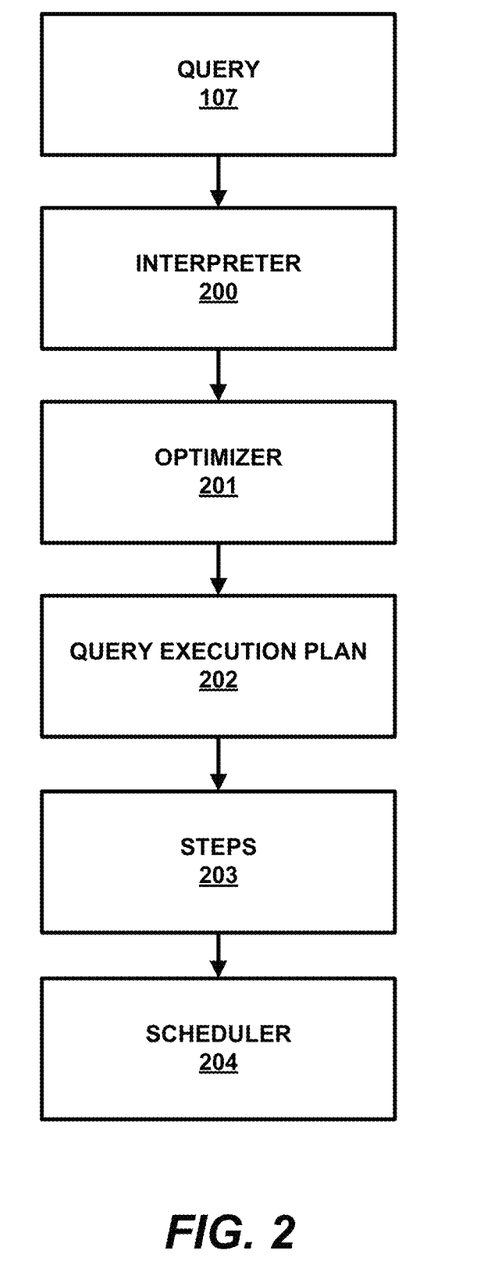
FIG. 2 is a flowchart that illustrates exemplary steps and functions performed when executing queries, according to an embodiment of the present invention.

FIG. 2 illustrates the steps or functions performed by the RDBMS 103 when processing a query 107, which typically comprises one or more data manipulation language (DML) statements, such as a structured query language (SQL) query. An interpreter 200 interprets the query 107, including checking the query 107 for proper syntax, evaluating the query 107 semantically, and consulting a data dictionary to ensure that all of the objects specified in the query 107 actually exist and that the user has the authority to perform the query 107. Then, an optimizer 201 generates and/or selects one or more query execution plans (QEPs) 202 for the query 107 based on cost profiles and other information, in order to determine an optimal QEP 202 for the query 107. In one embodiment, the QEP 202 is comprised of one or more steps 203, wherein the steps 203 of the QEP 202 may be performed in parallel. A scheduler 204 coordinates the execution of the steps 203 by the AMPs 105, and the retrieval of data from the VDISKs 106 in response to the execution of the steps 203.

Estimator of Resource Consumption

In one embodiment, a query 107 may be assigned an SLG, wherein the execution of the query 107 is monitored and compared against the SLG, and the resources and priorities necessary to achieve the SLG are regulated by adjusting and managing the RDBMS 103.

Due to the unpredictability of the execution time for the steps 203 individually and the query 107 overall, the SLG may not be met for all queries 107 every time, even when the system 100 has the capability and sufficient resources. A naïve solution could be to boost all queries 107, but that may adversely impact the SLGs for other queries 107. Boosting every query 107 may also be a wasteful allocation of critical resources to the query 107 being boosted, even when there is no necessity for boosting.

In the present invention, it is preferable to work on the step-level instead of the query-level for finer granularity. Thus, the present invention provides an estimator of resource consumption by the steps 203 of the QEPs 202, in order to identify those steps 203 that require boosting, and then boost the steps 203 either up or down to maximize the probability that the query 107 will meet its SLG.

The present invention casts the problem of predicting the execution time of a given step 203 as a supervised machine learning problem. Past execution data for steps 203 of QEPs 202 are used to train an ML model and its model parameters to predict execution times for the steps 203.

Thereafter, a prediction module, comprising the ML model configured by the model parameters, predicts an execution time for a current step 203 of a QEP 202 for a query 107, based on current step information and current system load. Essentially, the prediction module acts as an estimator of resource consumption by the steps 203 of the QEP 202.

A boosting module boosts the current step 203 either up or down for processing by the RDBMS 103 to meet the SLG for the query 107, based on the predicted execution time for the current step 203, as well as an elapsed query time, a query SLG time and/or a query CPU time. The boosting module may instruct the RDBMS 103 to boost a priority and/or an allocation of resources, such as CPU and/or I/O shares, used in executing the current step 203.

The elapsed query time is an amount of time already spent in processing the QEP 202, the query SLG time is an amount of time allocated for processing the QEP 202 to meet the SLG of the query 107, and the query CPU time is an amount of CPU time allocated for processing the QEP 202 to meet the SLG of the query 107. The elapsed query time indirectly takes into account the effects of load on the system 100, the amount of memory being used, and other run-time resources. The query SLG time and query CPU time are apportioned for each step 203 of the QEP 202 using, in one example, a ratio of a CPU estimate for each step 203 to a CPU estimate for the QEP 202, as determined by the optimizer 201. Other metrics may be used as well.

Figure 3:
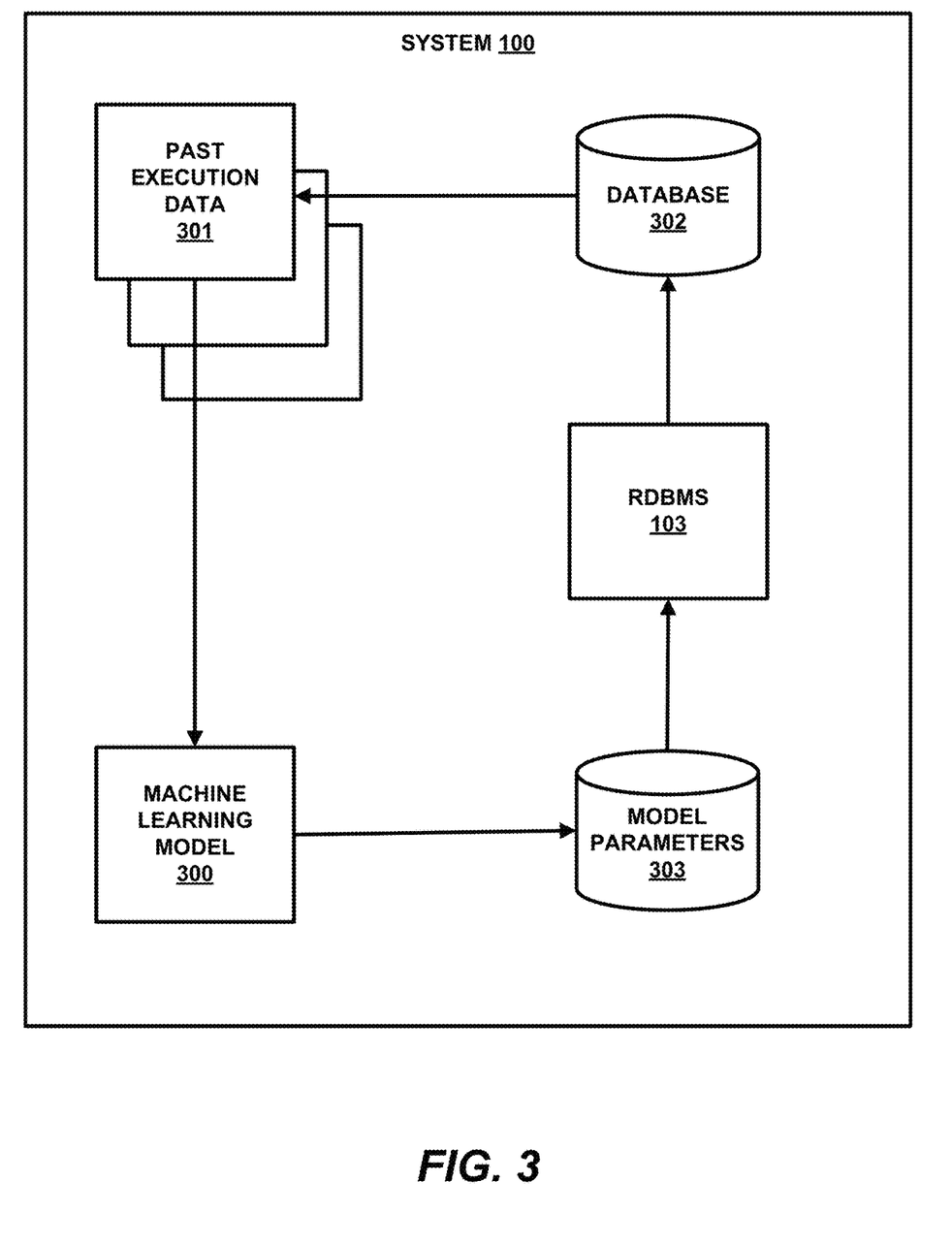
FIG. 3 is a schematic that illustrates an ML model being trained using past execution data, according to an embodiment of the present invention.
Figure 4:
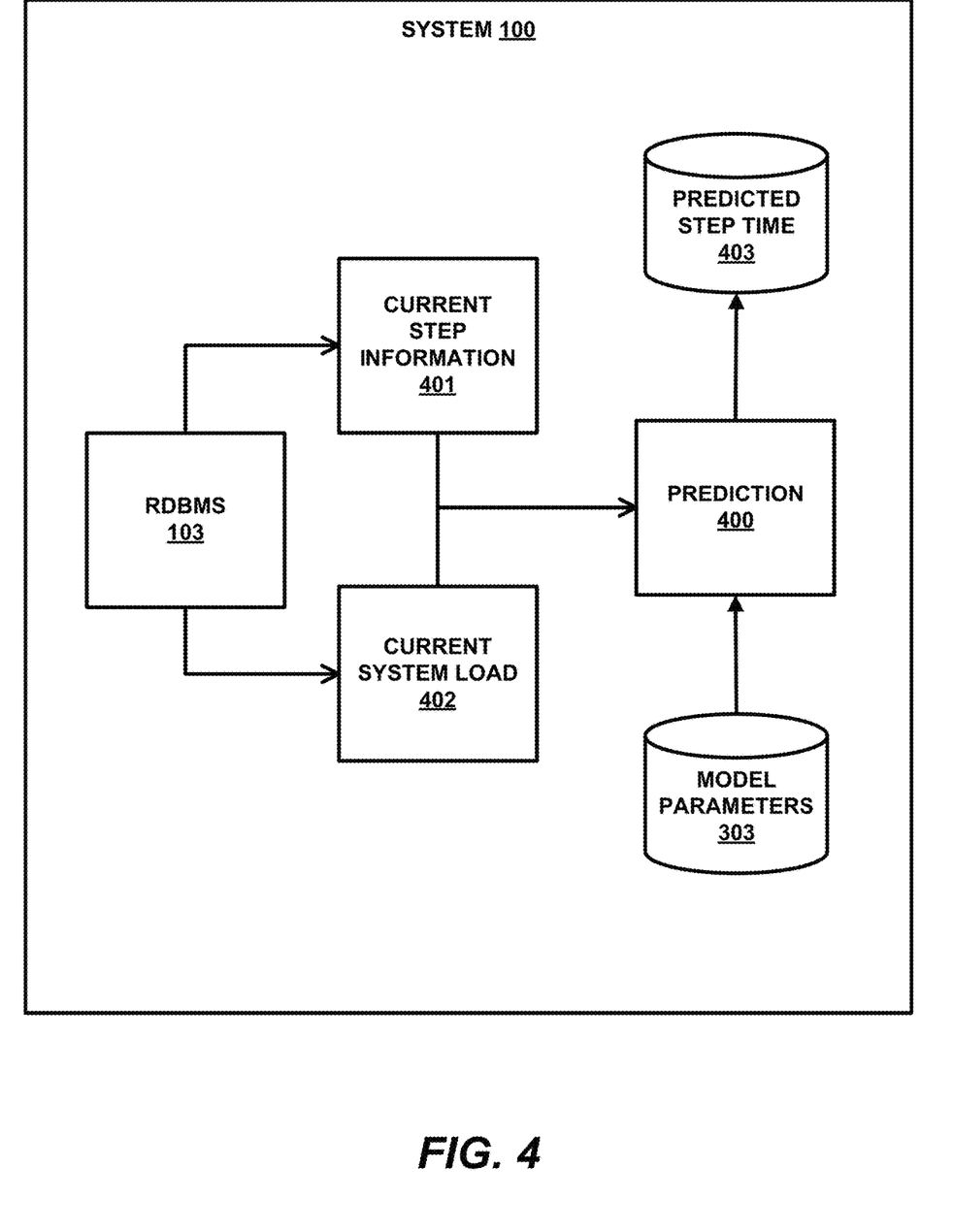
FIG. 4 is a schematic that illustrates a prediction module predicting an execution time for a current step of a query execution plan, according to an embodiment of the present invention.
Figure 5:
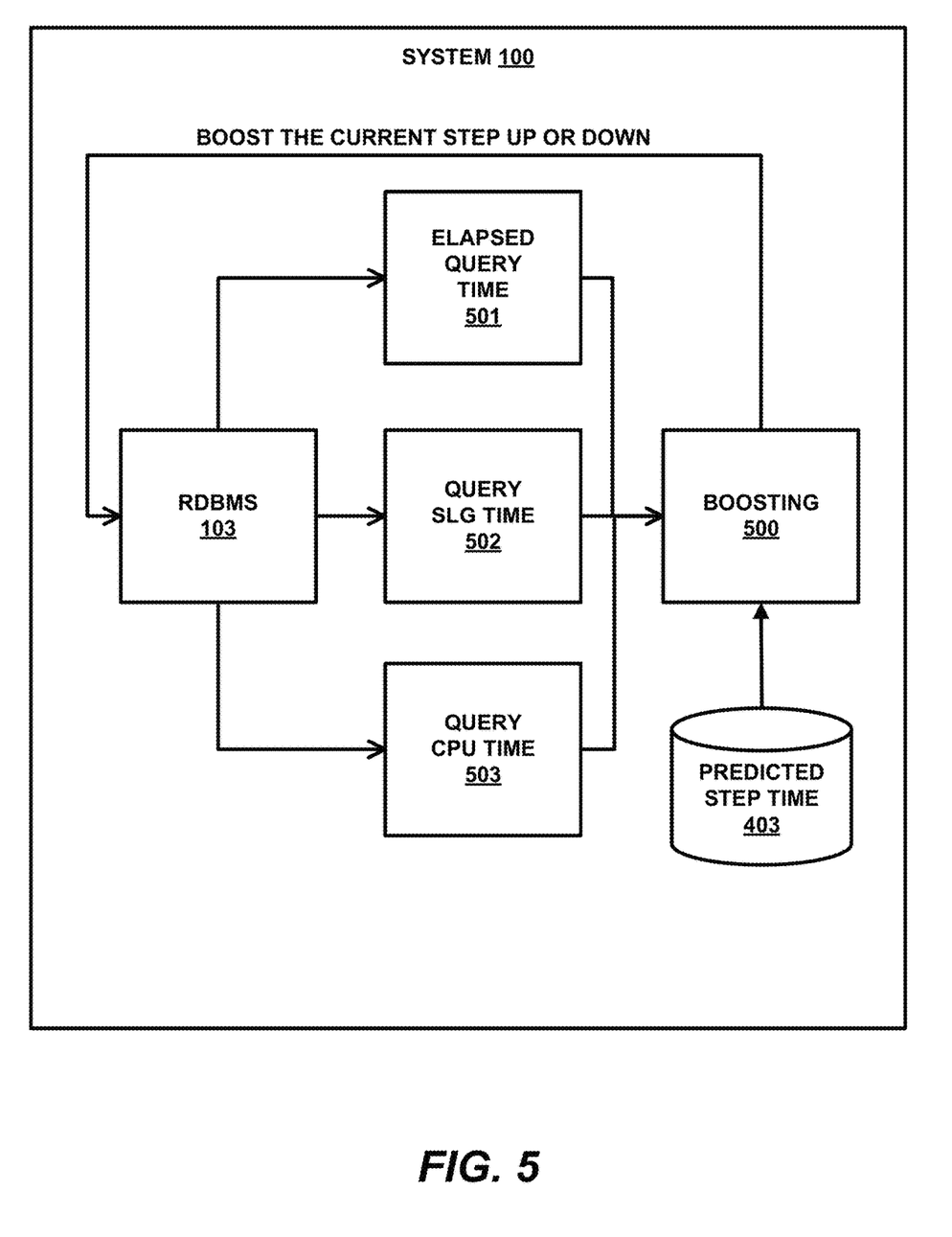
FIG. 5 is a schematic that illustrates a boosting module responsible for boosting (up or down) a current step of a query execution plan, according to an embodiment of the present invention.

These functions and steps are implemented as components of the system 100, as shown in FIGS. 3, 4 and 5.

FIG. 3 illustrates an ML model 300, executed by the system 100, being trained using past execution data 301 of the steps 203 previously performed, wherein the past execution data 301 is periodically obtained from a database 302 maintained by the RDBMS 103. The past execution data 301 is used to train the ML model 300 in order to generate the model parameters 303. The model parameters 303 of the ML model 300 are then saved in the RDBMS 103 for use at a later time when predictions are being made.

Moreover, different model parameters 303 may be generated, for example, based on different workloads, either real or predicted, and/or a time of day, a day of the week, month, or year, etc. These different model parameters 303 result in different ML models 300.

FIG. 4 illustrates a Prediction module 400, executed by the system 100, that is responsible for predicting the execution time of the current step 203, even before executing the step 203. Specifically, the Prediction module 400 comprises the trained ML model 300 configured by the model parameters 303. During operation, the RDBMS 103 provides current step information 401 and current system load 402 to the Prediction module 400, which in turn generates a predicted step time 403, i.e., the predicted execution time of the current step 203, based on the current step information 401 and the current system load 402.

In one embodiment, the current step information 401 may include one or more past execution times of the current step 203, and the current system load 402 may include a number of current load-factors, such as, but not limited to, CPU consumption, CPU demand, I/O consumption, I/O demand, memory availability, load on the system 100, a relative priority of the step 203 compared to other work on the system 100, concurrency, availability of other resources, such as threads, etc.

Moreover, the current step information 401 and/or the current system load 402 may be used by the Prediction module 400 to select among the different model parameters 303 in order to use the appropriate one of the different ML models 300. Also, as mentioned above, the Prediction module 400 may select among the different model parameters 303 based on different workloads, either real or predicted, a time of day, a day of a week, month, or year, etc.

FIG. 5 illustrates a Boosting module 500, executed by the system 100, that boosts the current step 203 either up or down for processing by the RDBMS 103, and more specifically, instructs the RDBMS 103 to increase or decrease the priority or allocation of resources, such as CPU and/or I/O shares, available to the execution of the current step 203. The Boosting module 500 compares the predicted step time 403 to an elapsed query time 501, a query SLG time 502, and/or a query CPU time 503, to determine a direction and an extent of a boost for the current step 203. The elapsed query time 501 is an amount of time spent in processing the QEP 202; the query SLG time 502 is an amount of time allocated for processing the QEP 202 to meet the SLG for the query 107, wherein the query SLG time 502 is apportioned for each step 203 of the QEP 202; and the query CPU time 503 is an amount of CPU time allocated for processing the QEP 202 to meet the SLG for the query 107, wherein the query CPU time 503 is apportioned for each step 203 of the QEP 202. As a result, the Boosting module 500 ensures that each step 203 of the QEP 202 contributes to meeting the SLG of the query 107, so that the step 203 optimization is thus aggregated to the overall query 107 optimization. Preferably, the resources of the RDBMS 103 are used to maximize the probability of each query 107 meeting its SLG and to minimize the probability of each query 107 failing its SLG.

Flowchart

Figure 6:
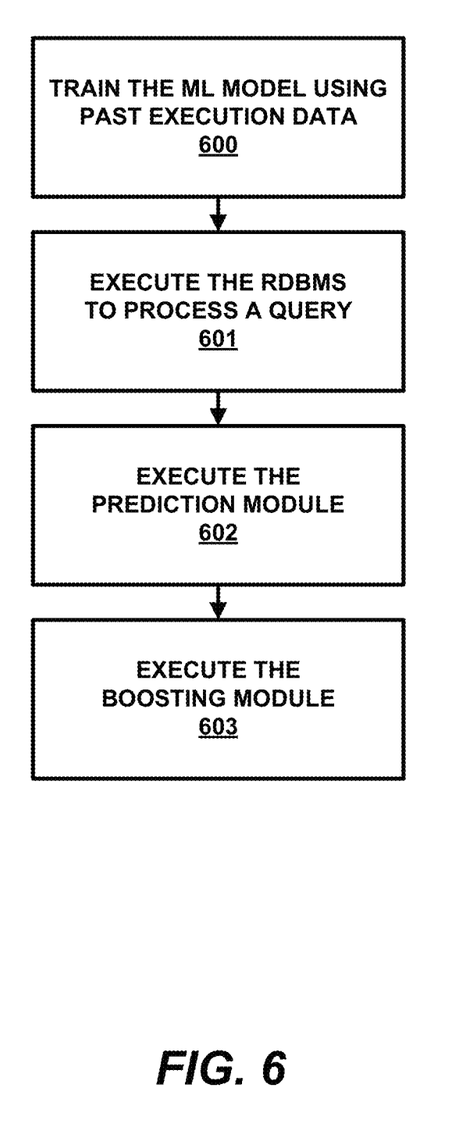
FIG. 6 is a flowchart that illustrates the steps performed in the present invention, according to an embodiment of the present invention.

FIG. 6 is a flowchart that illustrates the steps performed in the present invention, when executing an RDBMS 103 in a computer system 100, wherein the RDBMS 103 manages a relational database comprised of one or more tables storing data.

Block 600 represents the step of training the ML model 300 and its model parameters 303 for predicting the execution times for the steps using past execution data 301 for steps 203 of QEPs 202.

Block 601 represents the step of executing the RBMS 103 in the computer system 100, wherein the RDBMS 103 processes a query 107 to access a relational database comprised of one or more tables stored on one or more data storage devices 106 connected to the computer system 100.

Block 602 represents the step of executing the Prediction module 400 in the computer system 100, wherein the Prediction module 400 comprises an ML model 300 configured by model parameters 303 for predicting an execution time 403 for a current step 203 of a QEP 202 for the query 107, based on current step information 401 and current system load 402.

The Prediction module 400 selects the ML model 300 configured by the model parameters 303 based on the current step information 401; the Prediction module 400 selects the ML model 300 configured by the model parameters 303 based on the current system load 402; and/or the Prediction module 400 selects the ML model 300 configured by the model parameters 303 based on different workloads for a time of day, week, month or year.

Block 603 represents the step of executing the Boosting module 500 in the computer system 100, wherein the Boosting module 500 boosts the current step 203 either up or down for processing by the RDBMS 103 to meet the SLG for the query 107, based on the predicted execution time 403 for the current step 203, as well as an elapsed query time 501, a query SLG time 502, and/or a query CPU time 503.

The elapsed query time 501 is an amount of time spent in processing the QEP 202; the query SLG time 502 is an amount of time allocated for processing the QEP 202 to meet the SLG for the query 107, wherein the query SLG time 502 is apportioned for each step 203 of the QEP 202; and the query CPU time 503 is an amount of CPU time allocated for processing the QEP 202 to meet the SLG for the query 107, wherein the query CPU time 503 is apportioned for each step 203 of the QEP 202.

The Boosting module 500 compares the predicted execution time 403 for the current step 203 to the elapsed query time 501, the query SLG time 502, and/or the query CPU time 503, to determine a direction and an extent of the boost for the current step 203. The Boosting module 500 instructs the RDBMS 103 to boost a priority used in executing the current step 203, and/or the Boosting module 500 instructs the RDBMS 103 to boost an allocation of resources used in executing the current step 203, wherein the allocation of resources used in executing the current step 203 comprises CPU or I/O shares.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for estimating resource consumption by query execution plan steps, comprising:
   executing a relational database management system (RDBMS) in a computer system, wherein the RDBMS processes a query to access a relational database comprised of one or more tables stored on one or more data storage devices connected to the computer system;
   executing a prediction module in the computer system, wherein the prediction module selects a machine learning model from different machine learning models using a current step information or a current system load to select among different model parameters, each of the different machine learning models configured by the different model parameters for predicting an execution time for a current step of a query execution plan for the query based on the current step information or the current system load; and
   executing a boosting module in the computer system, wherein the boosting module boosts the current step either up or down for processing by the RDBMS to meet a service level goal (SLG) for the query, based on the predicted execution time for the current step, as well as an elapsed query time, a query SLG time, and/or a query CPU time.

2. The method of claim 1, wherein past execution data for steps of query execution plans are used to train the machine learning model and its model parameters for predicting the execution times for the steps.

3. The method of claim 1, wherein the elapsed query time is an amount of time spent in processing the query execution plan.

4. The method of claim 1, wherein the query SLG time is an amount of time allocated for processing the query execution plan to meet the SLG for the query.

5. The method of claim 4, wherein the query SLG time is apportioned for each step of the query execution plan.

6. The method of claim 1, wherein the query CPU time is an amount of CPU time allocated for processing the query execution plan to meet the SLG for the query.

7. The method of claim 6, wherein the query CPU time is apportioned for each step of the query execution plan.

8. The method of claim 1, wherein the boosting module compares the predicted execution time for the current step to the elapsed query time, the query SLG time, and/or the query CPU time, to determine a direction and an extent of the boost for the current step.

9. The method of claim 8, wherein the boosting module instructs the RDBMS to boost a priority used in executing the current step.

10. The method of claim 8, wherein the boosting module instructs the RDBMS to boost an allocation of resources used in executing the current step.

11. The method of claim 10, wherein the allocation of resources used in executing the current step comprises CPU or I/O shares.

12. The method of claim 1, wherein the prediction module selects the machine learning model configured by the model parameters based on different workloads for a time of day, week, month or year.

13. A computer-implemented apparatus for estimating resource consumption by query execution plan steps, comprising:
   a relational database management system (RDBMS) executing in a computer system, wherein the RDBMS processes a query to access a relational database comprised of one or more tables stored on one or more data storage devices connected to the computer system;
   a prediction module executing in the computer system, wherein the prediction module selects a machine learning model from different machine learning models using a current step information or a current system load to select among different model parameters, each of the different machine learning models configured by the different model parameters for predicting an execution time for a current step of a query execution plan for the query based on the current step information or the current system load; and
   a boosting module executing in the computer system, wherein the boosting module boosts the current step either up or down for processing by the RDBMS to meet a service level goal (SLG) for the query, based on the predicted execution time for the current step, as well as an elapsed query time, a query SLG time, and/or a query CPU time.

14. The apparatus of claim 13, wherein past execution data for steps of query execution plans are used to train the machine learning model and its model parameters for predicting the execution times for the steps.

15. The apparatus of claim 13, wherein the boosting module compares the predicted execution time for the current step to the elapsed query time, the query SLG time, and/or the query CPU time, to determine a direction and an extent of the boost for the current step.

16. The apparatus of claim 15, wherein the boosting module instructs the RDBMS to boost a priority used in executing the current step.

17. The apparatus of claim 15, wherein the boosting module instructs the RDBMS to boost an allocation of resources used in executing the current step.

18. A computer program product, the computer program product comprising a non-transitory computer readable storage medium having program instructions tangibly embodied therewith, the program instructions executable by a computer system to cause the computer system to perform a method for estimating resource consumption by query execution plan steps, comprising:

executing a relational database management system (RDBMS) in a computer system, wherein the RDBMS processes a query to access a relational database comprised of one or more tables stored on one or more data storage devices connected to the computer system;

executing a prediction module in the computer system, wherein the prediction module selects a machine learning model from different machine learning models using a current step information or a current system load to select among different model parameters, each of the different machine learning models configured by the model parameters for predicting an execution time for a current step of a query execution plan for the query based on the current step information or the current system load; and executing a boosting module in the computer system, wherein the boosting module boosts the current step either up or down for processing by the RDBMS to meet a service level goal (SLG) for the query, based on the predicted execution time for the current step, as well as an elapsed query time, a query SLG time, and/or a query CPU time.

* * * * *